US009411407B2

(12) United States Patent
Alshinnawi, Sr. et al.

(10) Patent No.: US 9,411,407 B2
(45) Date of Patent: *Aug. 9, 2016

(54) SEQUENTIAL POWER UP OF DEVICES IN A COMPUTING CLUSTER BASED ON RELATIVE COMMONALITY

(71) Applicant: Lenovo Enterprise Solutions (Singapore) Pte. Ltd., Singapore (SG)

(72) Inventors: Shareef F. Alshinnawi, Sr., Durham, NC (US); Gary D. Cudak, Creedmoor, NC (US); Edward S. Suffern, Chapel Hill, NC (US); J. Mark Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 522 days.

This patent is subject to a terminal disclaimer.

(21) Appl. No.: 13/711,778

(22) Filed: Dec. 12, 2012

(65) Prior Publication Data
US 2014/0164794 A1  Jun. 12, 2014

(51) Int. Cl.
*G06F 1/26* (2006.01)
*G06F 1/32* (2006.01)

(52) U.S. Cl.
CPC ........... *G06F 1/3287* (2013.01); *Y02B 60/1282* (2013.01)

(58) Field of Classification Search
CPC .......................... G06F 1/3287; Y02B 60/1282
See application file for complete search history.

(56) References Cited

U.S. PATENT DOCUMENTS

| | | | | |
|---|---|---|---|---|
| 6,766,222 | B1 * | 7/2004 | Duley | 700/286 |
| 6,882,530 | B2 * | 4/2005 | Cyphers et al. | 361/829 |
| 6,968,465 | B2 | 11/2005 | Freevol et al. | |
| 7,305,572 | B1 * | 12/2007 | Burroughs et al. | 713/300 |
| 7,479,714 | B1 * | 1/2009 | Rogers et al. | 307/38 |
| 7,552,351 | B2 * | 6/2009 | Chang | 713/330 |
| 8,255,728 | B2 * | 8/2012 | Liao | 713/330 |
| 8,447,998 | B2 * | 5/2013 | Andresen et al. | 713/300 |

(Continued)

FOREIGN PATENT DOCUMENTS

EP    2133771 A2    12/2009

OTHER PUBLICATIONS

IP.Com, "Rack Identification Reporting and Illumination", IP.com No. IPCOM000206950D, May 13, 2011, pp. 1-3 with a cover page.
Solutions Guide, "Power Management", Issue 1, Jul. 2005, Avnet Electronics Marketing, www.em.avnet.com, pp. 1-72.

(Continued)

*Primary Examiner* — M Elamin
(74) *Attorney, Agent, or Firm* — Katherine S. Brown; Jeffrey L. Streets

(57) ABSTRACT

A computer program product includes computer usable program code for: identifying a plurality of power distribution units (PDUs) disposed in a rack, wherein each PDU receives power from a main power source and includes a circuit breaker; identifying a plurality of devices disposed in the rack, wherein each device receives power from one of the PDUs, and wherein the plurality of devices are selected from server nodes, network switches and external data storage devices; obtaining vital product data from a service processor in each device, wherein the vital product data identifies the device by a model identification code; and powering on, for each of the PDUs, the plurality of devices that are connected to the PDU in a sequence to prevent an inrush current from tripping the circuit breaker within the PDU, wherein the sequence powers on devices in order of ascending commonality of the model identification code.

16 Claims, 7 Drawing Sheets

(56) References Cited

U.S. PATENT DOCUMENTS

| | | | |
|---|---|---|---|
| 8,533,497 B2* | 9/2013 | Wang | 713/300 |
| 8,732,448 B2* | 5/2014 | Khatri et al. | 713/2 |
| 2008/0028238 A1 | 1/2008 | Lucas et al. | |
| 2012/0117396 A1 | 5/2012 | Ewing et al. | |
| 2012/0136484 A1 | 5/2012 | Wang et al. | |
| 2012/0137141 A1* | 5/2012 | Wang | 713/300 |
| 2012/0173033 A1 | 7/2012 | Tischer | |

OTHER PUBLICATIONS

Bodner et al., "Power management system for e.g. computer system, has timer delaying power-on mask, PAL register bit masking power-on events after power is restored, and BMC unmasking bit, power-on mask, after delay timer expires", DERWENT-ACC-No. 2006-657678, Derwent-Week:200668, RD509056A, Sep. 10, 2006, 2 pages.

* cited by examiner

SEQUENTIAL POWER UP OF DEVICES IN A COMPUTING CLUSTER BASED ON RELATIVE COMMONALITY

BACKGROUND

1. Field of the Invention

The present invention relates to methods of providing electrical power to the devices in a computing cluster, and more particularly relates to methods of sequencing the power up of devices in a cluster or data center.

2. Background of the Related Art

High performance computing clusters contain a large number of server nodes, network switches, and data storage devices. There are times when the entire cluster of such information technology equipment needs to be powered-off for service. When these cluster entities are powered back on, there is a large inrush of electrical current from the main power distribution center. This inrush current can trip a circuit breaker at the main distribution center or it can trip a circuit breaker at the individual power distribution units (PDUs) that are positioned within the individual racks of the cluster. A common way to limit the inrush of electrical current is to add inductors to the input of each power supply so that the resistor-inductor-capacitor (R-L-C) circuit slowly ramps up the current supplied to the design.

BRIEF SUMMARY

One embodiment of the present invention provides a method of powering on a plurality of devices. The method includes identifying a plurality of power distribution units disposed in a rack, wherein each power distribution units is connected to received power from a main power source, and wherein each power distribution unit includes a circuit breaker. The method further includes identifying a plurality of devices disposed in the rack, wherein each device is connected to receive power from one of the power distribution units, and wherein the plurality of devices are selected from server nodes, network switches and external data storage devices. Vital product data is obtained from a service processor in each device, wherein the vital product data identifies the device by a model identification code. For each of the power distribution units, the plurality of devices that are connected to the power distribution unit are powered on in a sequence to prevent an inrush current from tripping the circuit breaker within the power distribution unit, wherein the sequence powers on devices in order of ascending commonality of the model identification code.

Another embodiment of the invention provides a computer program product including computer usable program code embodied on a tangible computer usable storage medium. The computer program product includes computer usable program code for identifying a plurality of power distribution units disposed in a rack, wherein each power distribution units is connected to received power from a main power source, and wherein each power distribution unit includes a circuit breaker; computer usable program code for identifying a plurality of devices disposed in the rack, wherein each device is connected to receive power from one of the power distribution units, and wherein the plurality of devices are selected from server nodes, network switches and external data storage devices; computer usable program code for obtaining vital product data from a service processor in each device, wherein the vital product data identifies the device by a model identification code; and computer usable program code for powering on, for each of the power distribution units, the plurality of devices that are connected to the power distribution unit in a sequence to prevent an inrush current from tripping the circuit breaker within the power distribution unit, wherein the sequence powers on devices in order of ascending commonality of the model identification code.

DETAILED DESCRIPTION

Figure 1:
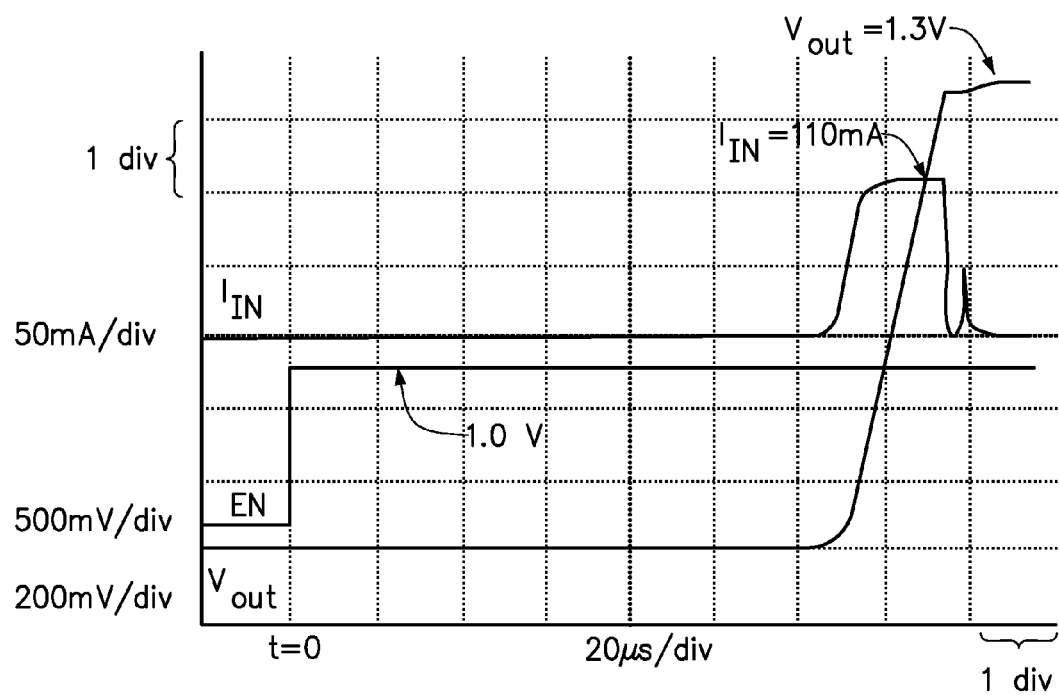
FIG. 1 is a graph showing the relationship of inrush current at initial power on of an example circuit compared to the operational current of the same circuit.

One embodiment of the present invention provides a method of powering on a plurality of devices. The method includes identifying a plurality of power distribution units disposed in a rack, wherein each power distribution units is connected to received power from a main power source, and wherein each power distribution unit includes a circuit breaker. The method further includes identifying a plurality of devices disposed in the rack, wherein each device is connected to receive power from one of the power distribution units, and wherein the plurality of devices are selected from server nodes, network switches and external data storage devices. Vital product data is obtained from a service processor in each device, wherein the vital product data identifies the device by a model identification code. For each of the power distribution units, the plurality of devices that are connected to the power distribution unit are powered on in a sequence to prevent an inrush current from tripping the circuit breaker within the power distribution unit, wherein the sequence powers on devices in order of ascending commonality of the model identification code.

In a preferred embodiment, the step of determining the order of ascending commonality is performed by tabulating the number of devices having a given model identification code and sorting a list of model identification codes from those having the fewest tabulated number of devices to those having the greatest tabulated number of devices. The model identification codes are typically stored in the vital product data of a device, such as a server, network switch or data storage device. This vital product data may be communicated from the BMC or other service processor of the individuals devices to a central management entity. The central management entity may store the model identification codes and tabulate them. The number of instances of any particular model identification code represents a device's commonality. The devices having the least commonality (i.e., fewest number of devices with the same model identification code) are viewed as performing a specialized role or function in the cluster and are, therefore, given a higher priority in the power on sequence. For example, if a cluster includes a quantity of four x3650 M4 servers and a quantity of two hundred (200)

HS23 servers (x3650 M4 servers and HS23 servers are both available from International Business Machines Incorporation of Armonk, N.Y.), then it can be assumed that the role of the x3650 M4 servers have greater importance in the cluster, and should be given a higher prioritization in the power on sequence, than the x3650 M4 servers.

The sequence may include powering on more than one of the devices at a time, so long as the inrush current to those devices will not trip the circuit breaker of the power distribution unit providing power to those devices. The sequence may also wait a predetermined period of time between powering on any one or more device and subsequently powering on any further device connected to the same power distribution unit. Waiting for a period of time allows the inrush current to settle down. In yet another embodiment, the sequence of powering on the plurality of devices in a cluster may be implemented to also prevent the cumulative inrush current to the cluster from tripping a circuit breaker within the main power source that is connected to provide power to each of the power distribution units.

In a further embodiment, the method further includes identifying the rack position of each device with the rack, wherein the rack position determines the power distribution unit to which the device is connected. Optionally, the rack position of each device is identified by each device detecting a rack position and communicating the detected rack position to a central management entity.

A still further embodiment of the method may include quantitative methods to assure that the devices powered on in any one step of the sequence will not trip the circuit breaker of the power distribution unit from which those devices receive power. One such method determines a peak inrush current for each of the plurality of devices, and determines a current rating for the circuit breaker in each of the plurality of power distribution units. Then, the method determines a sequence that, for each of the plurality of distribution units, will power on the plurality of devices without causing a cumulative peak inrush current through the power distribution unit that exceeds the current rating for the circuit breaker in the power distribution unit. The cumulative peak inrush current is the sum of the peak inrush current through the power distribution unit to all of the devices being simultaneously powered on at any point in the sequence. The peak inrush current for each device may be measured, but may also be estimated as a predetermined multiple of the nominal current rating of the device. For example, the peak inrush current for a server is typically between 12 and 20 times the server's nominal current rating. The nominal current rating of the device may be included in a device's vital product data, which may be obtained from a service processor in the device.

Another embodiment of the invention provides a computer program product including computer usable program code embodied on a tangible computer usable storage medium. The computer program product includes computer usable program code for identifying a plurality of power distribution units disposed in a rack, wherein each power distribution units is connected to received power from a main power source, and wherein each power distribution unit includes a circuit breaker; computer usable program code for identifying a plurality of devices disposed in the rack, wherein each device is connected to receive power from one of the power distribution units, and wherein the plurality of devices are selected from server nodes, network switches and external data storage devices; computer usable program code for obtaining vital product data from a service processor in each device, wherein the vital product data identifies the device by a model identification code; and computer usable program code for powering on, for each of the power distribution units, the plurality of devices that are connected to the power distribution unit in a sequence to prevent an inrush current from tripping the circuit breaker within the power distribution unit, wherein the sequence powers on devices in order of ascending commonality of the model identification code. It should be recognized that the computer program product may include further computer usable program code to implement one or more additional steps or aspects of the methods described herein.

FIG. 1 is a graph showing the relationship of inrush current at initial power on of an example circuit compared to the operational current of the same circuit. EN is the enable signal to a power supply that allows the voltage to be turned on. $I_{IN}$ is the current provided to the power supply to allow the output voltage to be supplied. $V_{OUT}$ is the output voltage from the power supply to the circuit, such as a server.

The EN signal had a scale of 500 mV/division on the vertical axis, such that the EN voltage goes from 0 volts to 1.0 volts. The current $I_{IN}$ is shown with a scale of 50 mA/div, such that the inrush current temporarily rises from 0 mA to about 110 mA, whereas the nominal operating current is about 5 mA. Accordingly, the inrush current can be nearly 20 times the nominal operating current rating. The $V_{OUT}$ scale is 200 mV/division, such that the voltage goes form 0 volts to about 1.3 volts. The x-axis represents the passage of time, where each division on the horizontal axis represents 20 microseconds (μs). So if the EN enable signal starts at t=0 microseconds, the output voltage starts to rise after about 130 microseconds and reaches its full value of 1.3 V at about 147 microseconds. Turning on a given circuit will produce a quantifiable inrush current, but this figure is only intended as a qualitative representation of what would happen in a server. Actual measurements of the maximum nominal current and peak inrush current for several representative devices are provided in Table 1, below, where the duration of the inrush current is measured in milliseconds (ms).

TABLE 1

Relationship of nominal current and inrush current in representative devices

| Equipment | Maximum Nominal Current | Peak Inrush Current |
| --- | --- | --- |
| HP Proliant DL 360 G4 - IU server | 2.4 A | 61 A for 3 ms |
| HP Proliant e-class blade server | 1.6 A | 100 A for 2 ms |
| IBM BladeCenter, fully loaded | 23.7 A | 200 A for 4 ms |
| IBM x-series 260 | 4.9 A | 120 A for 4 ms |
| Cisco 3825 Router | 2 A | 50 A for 10 ms |

A typical PDU circuit breaker will trip at a current that is somewhere between 12 to 20 times the rated current of the PDU. For example, a 30 Amp PDU can sustain 360 AMPs to 600 AMPs for a short period. For a group of IBM xSeries 260 servers, with an inrush current of 120 amps each (as shown in Table 1, above), it is theoretically possible to simultaneously turn on up to five of the servers coupled to a single 30 Amp PDU, since the total current inrush of 600 Amps (5×120 Amps) would not exceed the 600 Amps that the circuit breaker than momentarily accept. However, a much more conservative operation would turn on fewer than five servers at a time. A preferred method would execute a sequence that turns on just two such servers at a time, then waits, and then turns on two more servers. For a PDU powering a group of eight (8) servers, a corresponding power on sequence might include four steps. By using a very conservative number of devices to be simultaneously turned on through a single PDU, it is not necessary to perform actual calculations to verify that the total inrush current will not trip the PDU circuit breaker.

Figure 2:
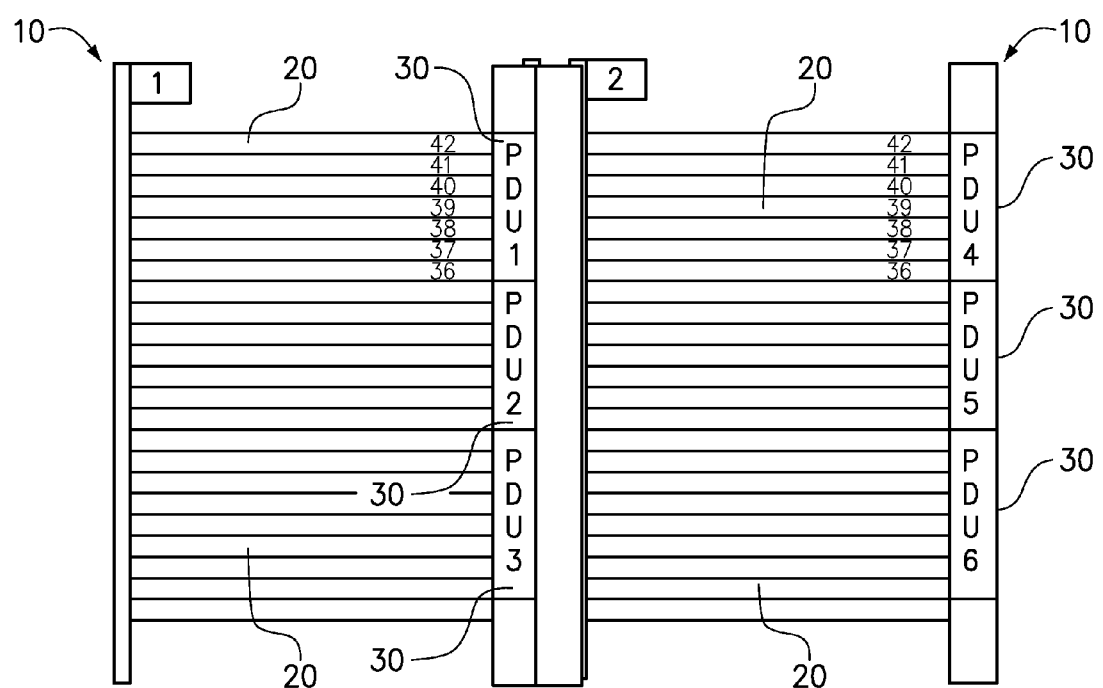
FIG. 2 is a diagram of a rack having several servers coupled to each of the several power distribution units (PDUs).

FIG. 2 is a diagram of two side-by-side racks (Rack 1 and Rack 2) 10, where each rack supports the operation of several servers 20. The servers are shown as "1U" servers, but the servers need not all have the same form factor. However, each server 20 is coupled to one of the several power distribution units (PDUs) 30. Each rack illustrates a direct, laterally adjacent relationship between a PDU and a group (subset) of the servers that are connected to receive power from the PDU. As shown, PDU #1 supplies power to the eight servers received within rack bays 35-42, which are directly laterally adjacent the PDU #1.

Methods of the invention reduce the inrush current so that a circuit breaker is less likely to be tripped than when every server is powered on simultaneously. The power on command is distributed across a number of PDUs in a cluster at a controlled rate so that no one PDU has an inrush current that would trip its circuit breaker. However, the individual devices are powered on in a logical sequence or order across the cluster until all the servers and other devices are powered on.

The sequential powering on of the devices relies upon a certain period of time passing between each step in the sequence, so that the inrush current, which results from powering on a first set of devices, can quiet down before proceeding to power on a second set of devices in the sequence. The amount of time needed for the inrush current to quiet down or reach a value near the nominal operating current is dependent upon the circuit for a device. Although it is possible to measure the exact time period that each device requires for the inrush current to settle, a conservative time delay of about 100 to 500 microseconds may be adopted for all devices in a server environment.

Since the cluster has a plurality of PDUs distributing power in parallel to each other, servers and other devices within the cluster may also be turned on in parallel. However, the servers connected to any one particular PDU should be turned on in a sequential manner. Still, if the PDU has a sufficient current rating, then more than one server may be turned on during any one step in the sequence.

Figure 3:
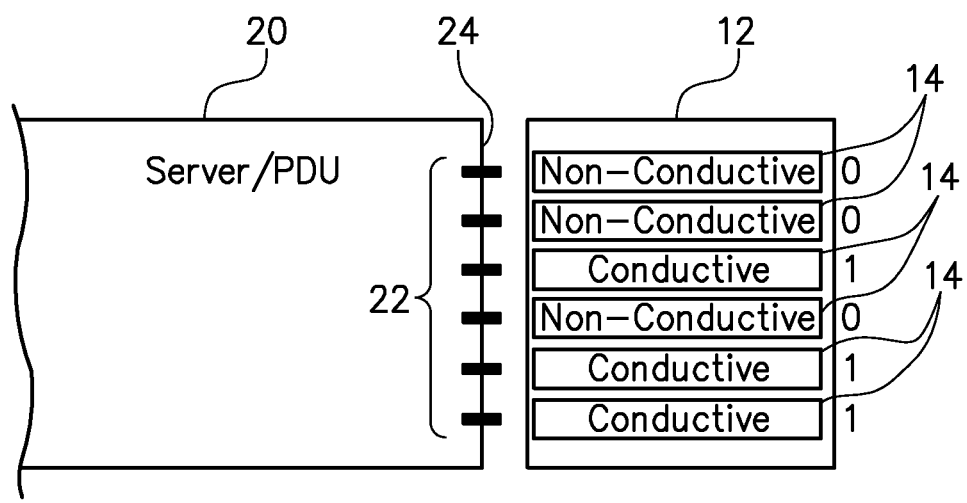
FIG. 3 is a diagram of a server aligned for contact with an address plate in a given position within a rack.

FIG. 3 is a diagram of a device 20, such as a server or PDU, aligned for contact with an address plate 12 in a given position within a rack. Each device 20 can determine its own position within the rack and communicate that position to a central management entity, such as an xCAT management entity (available from International Business Machines Corporation of Armonk, N.Y.). Rack positions may be selected from a known number and arrangement of bays within the rack, such as following a standard configuration of "1U" bays. For example, a server 20 can detect its own position using a plurality of spring-loaded electrical pickups 22 formed along a back surface 24 of the server and aligned for contact with an equal plurality of contacts 14 on an address plate securing within the rack. As shown, there are six pickups 22 aligned with six contacts 14. The contacts 14 on each address plate 12 are either conductive or non-conductive and are arranged to provide a unique binary code representing a known location in the rack. Optionally, a non-conductive contact may represent a "0" and a conductive contact may represent a "1". When the contacts 14 are arranged for contact with the spring-loaded electrical pickups 22, the server 20 is able to read the address that represents its location within the rack. For example, the address shown is binary "1 1 0 1 0 0", which equates to position 11 within the rack. A PDU may similarly detect its own position. Based upon a consistent practice of connecting a server 20 to a power distribution unit 30 based upon their relative positions within the rack (See FIG. 2), such as making power connections directly laterally, the relative positions can be considered to be determinative of which servers are connected to which PDUs.

Figure 4:
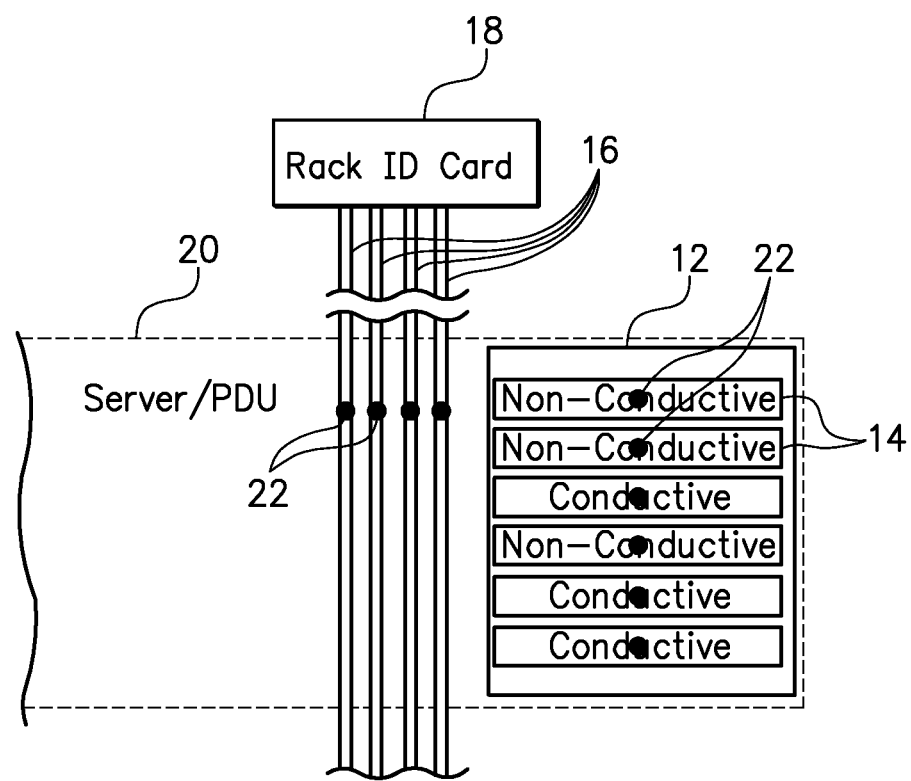
FIG. 4 is a diagram of a server aligned in contact with rack identification wires and the address plate.

FIG. 4 is a diagram of a device 20, such as a server or a PDU, aligned in contact with rack identification wires 16 and the address plate 12. Accordingly, each device may detect a rack identification or address for the rack in which the device is positioned. For example, a rack identification card 18 may be added to the rack and may include a battery and electrical wires 16 that run down a vertical frame of the rack. The rack identification card 18 includes a unique rack address that is placed onto the wires 16 that run from the card connection down the rack frame. As described above for position detecting within a rack, the installed server or PDU may include electrical pickups 22 that are aligned for contact with the wires 16 along the vertical frame. For example, a plurality of wires may be selectively coupled to a battery or ground in order to comprise a binary rack identification number. One illustration of the location of a device 20 may be represented as Rack#-U#, which is a concatenation of the rack identification (Rack #) and the U position (U#) of the device, such as the servers 20 in racks 10 shown in FIG. 2.

Figure 5:
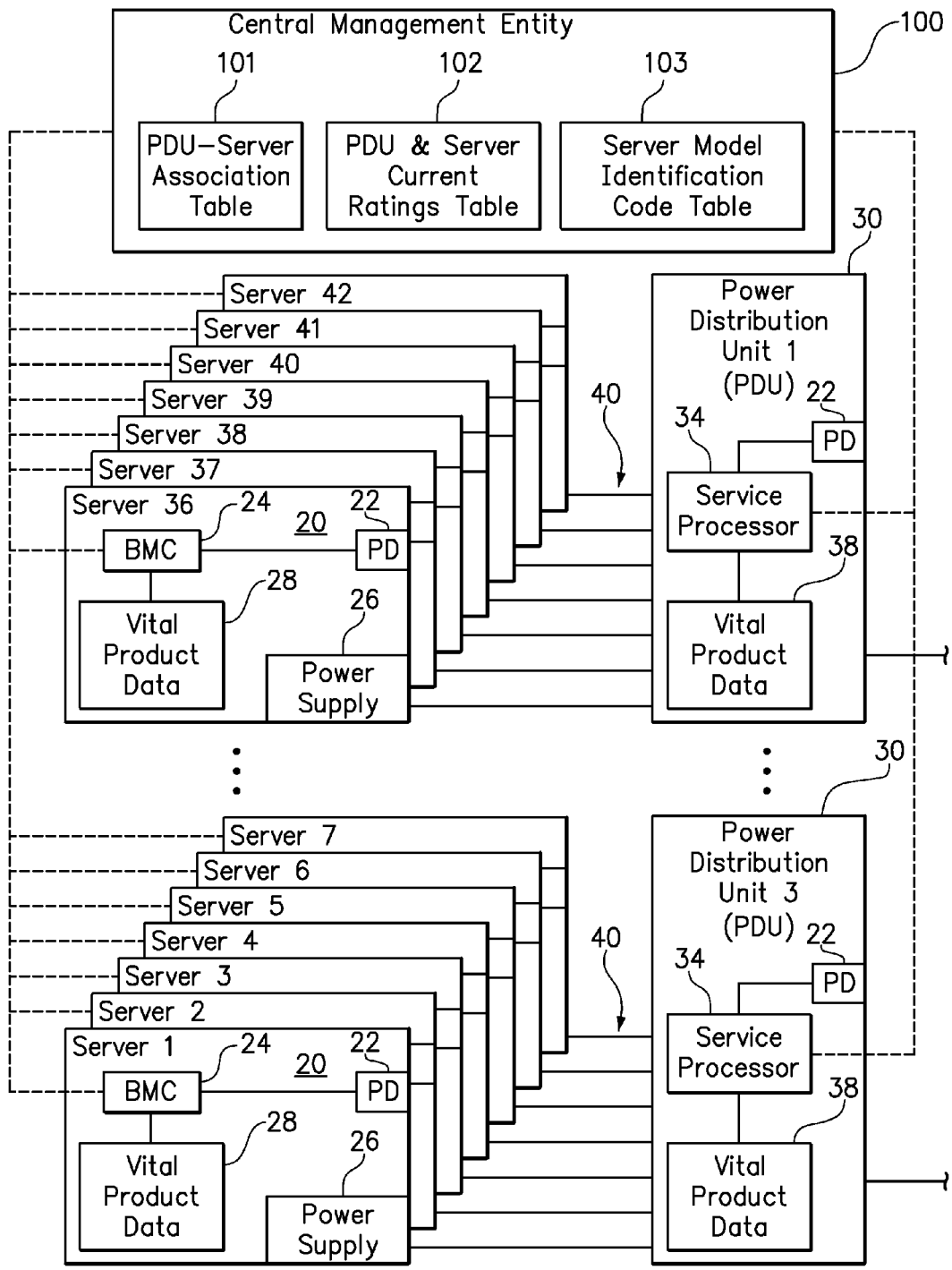
FIG. 5 is a block diagram of a system having a plurality of servers coupled to a plurality of power distribution units.

FIG. 5 is a block diagram of a system having a plurality of servers 20 coupled to a plurality of power distribution units 30. More specifically, the system has a first group of servers (Servers 1-7) that each have a power supply 26 connected to receive power from a first PDU (PDU 3) via power cables 40 and a second group of servers (Servers 36-42) that each have a power supply 26 connected to receive power from a second PDU (PDU 1) via power cables 40. As shown, the Servers 1-7 are directly laterally adjacent PDU 1 and Servers 36-42 are directly laterally adjacent PDU 3. While the power cables may be manually connected, the servers 20 and the PDUs 30 include position detectors (PD) 22 consistent the spring-loaded electrical pickups of FIGS. 3-4. Each server 20 has a baseboard management controller (BMC) 24 that can communicate the server's detected position to the central management entity 100 and each PDU has a service processor 34 that can communicate the PDU's detected position to the central management entity 100. Based upon the direct laterally adjacent positions detected, the central management entity 100 can determine that which servers are connected to which PDU. These PDU-server associations are stored in the PDU-Server Association Table 101.

Each server 20 also includes vital product data 28 about the server, and each PDU 30 also includes vital product data 38 about the PDU. The vital product data 28 of the server 20 may include the server's nominal current rating and the server's role in the cluster. Accordingly, the BMC 28 may share the vital product data 28 with the central management entity 100, where the central management entity 100 may store the nominal current rating in a table 102 and store the server's role or function in a table 103. Similarly, the vital product data 38 of the PDU 30 may include the PDU's nominal current rating, such that the service processor 34 may share the vital product data 38 with the central management entity 100, such as for storage in the current ratings table 102.

According to various embodiments of the invention, the central management entity 100 may consider the data in the PDU-Server Association Table 101, the PDU & Server Current Ratings Table 102, and the Server Model Identification Table 103 in determining a power on sequence for the devices in the cluster. It should be recognized that any one or more of the servers 20 in the cluster of FIG. 5 may be substituted with a network switch, and Table 103 could also include model identification codes for network switches, storage devices, and yet other devices, without other modification of the description provided herein. Accordingly, the central management entity 100 may power on any management nodes, network switches, storage devices and server nodes based on their ascending commonality among the devices in the cluster. The relative commonality of each device may be used in conjunction with the power consumption per entity to proactively and intelligently limit the inrush current on each PDU.

In any server design, when the servers are connected to a power distribution circuit, the internal baseboard management controllers become active. Because of the low current draw, the amount of inrush current across the entire installation is minimal and causes no problems. Once the base board management controllers are operational, they are able to read the vital product data (VPD) of the server and determine the amount of power dissipated in the server planar. The management entity which is connected to each BMC over an Ethernet network can then communicate the power draw and current required for each server. In addition, each PDU also has a service processor that communicates with the central management entity.

Based upon data describing which servers receive power from which PDU, the management entity is then able to determine a total amount of nominal current demand that is to be placed on each PDU. Similarly, based upon data describing which PDUs (and hence which servers) are located within a given rack, the management entity is able to determine a total amount of nominal current demand that is to be placed on each rack. Furthermore, based upon data identifying the racks that are located in a cluster, the cluster management entity is able to determine a total amount of nominal current demand that is to be placed on the cluster. Once this current is calculated, the central management entity is able to systematically power on the entire cluster balancing the inrush current across the cluster and limiting the inrush current to each individual PDU within a rack, and to each rack within the cluster.

In the situation where there are an equal number of two or more different devices, as identified by tabulating the number of devices having the same model identification codes, then the power up sequence may use the device's network dependency criteria as a secondary consideration. For example, devices that provide fabrics like switches, management systems, and devices with VPD that indicate existence of external storage may be powered on first. For example, if the central management entity determines that there are four x3650 M4 servers and four network switches, the secondary consideration might weight in favor of powering on the four network switches prior to the four x2650 M4 servers.

Basically, the management tool does a server power walk and associates the server power with each PDU. Once this information is tabulated, then the power draw per PDU can be calculated. Then the management tool selectively powers on the servers ensuring that the inrush current does not exceed the PDU specification. In addition, since the PDUs are connected to AC power, the management tool can ensure that the inrush current does not exceed the AC power ratings for the site.

Table 1, shown below, is a tabular representation of a power on sequence to limit the inrush current.

TABLE 1

| Power on sequencing | | | |
|---|---|---|---|
| PDU | Server | Power | Sequence limit 1400 W |
| PDU #1 | 42 | 450 | 2 |
| | 41 | 350 | 1 |
| | 40 | 350 | 2 |
| | 39 | 550 | 1 |
| | 38 | 450 | 2 |
| | 37 | 450 | 1 |
| | 36 | 450 | 3 |
| . | . | . | . |
| . | . | . | . |
| . | . | . | . |
| | 8 | 600 | 2 |
| PDU #3 | 7 | 600 | 2 |
| | 6 | 350 | 3 |
| | 5 | 400 | 3 |
| | 4 | 400 | 3 |
| | 3 | 450 | 1 |
| | 2 | 600 | 1 |
| | 1 | 300 | 1 |

Figure 6:
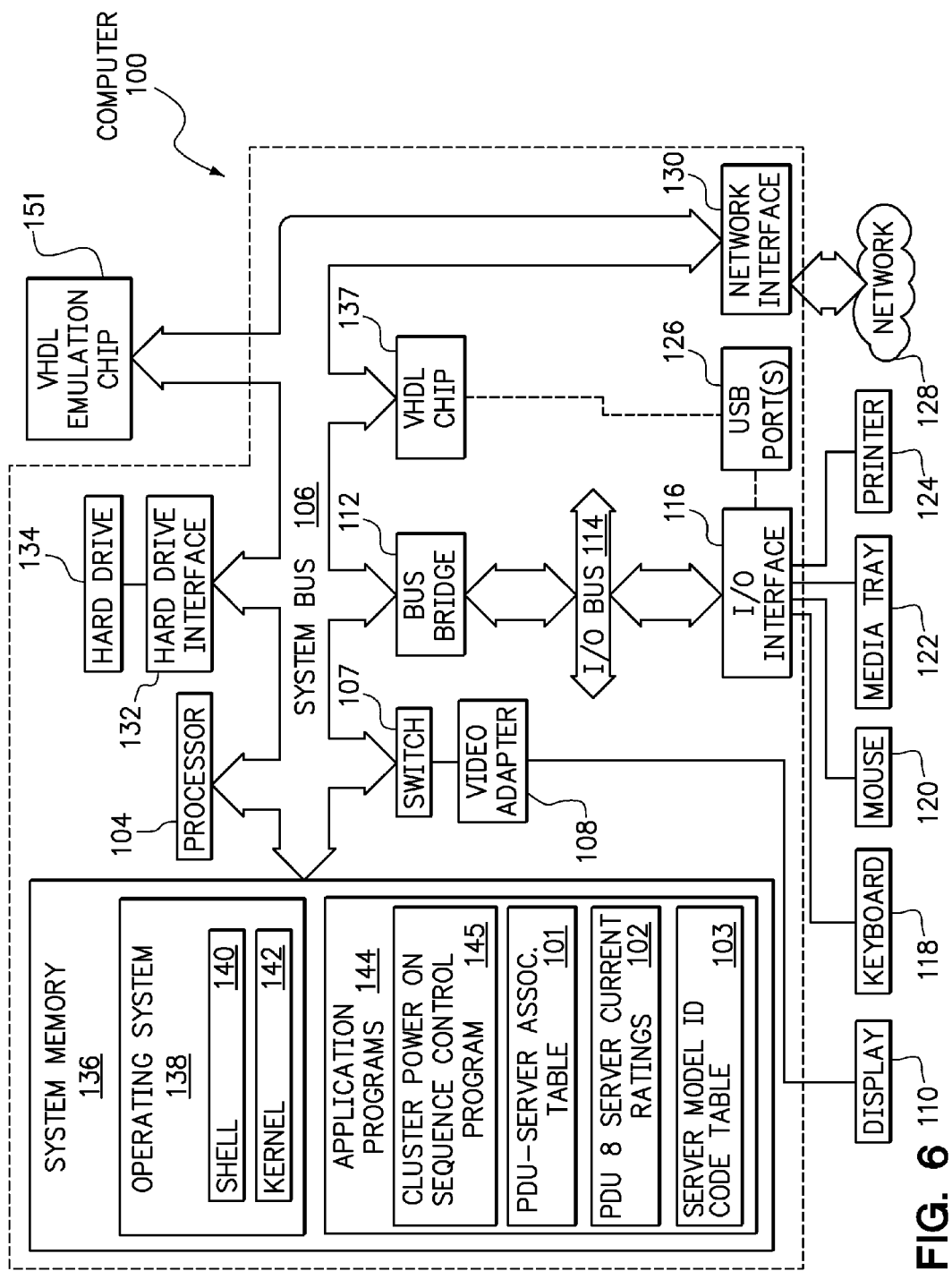
FIG. 6 is a diagram of a computer capable of serving as a central management entity.

FIG. 6 is a diagram of an exemplary computing node (or simply "computer") 102 that may be utilized in accordance with one or more embodiments of the present invention. Note that some or all of the exemplary architecture, including both depicted hardware and software, shown for and within the computer 100 may be implemented in the central management entity shown in FIG. 5.

Computer 100 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, the computer 100 is able to communicate over a network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 100. This volatile memory includes additional higher levels of volatile memory (not shown), including, but not limited to, cache memory, registers and buffers. Data that populates system memory 136 includes the computer's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management. Application programs 144 in the system memory of computer 100 may include a cluster power on sequence control program 145. The system memory 136 may also store the PDU-Server Association Table 101, the PDU & Server Current Ratings Table 102, and the Server Model Identification Code Table 103 for use in the methods described herein.

The system memory 136 may also include a VHDL (VHSIC hardware description language) program. VHDL is an exemplary design-entry language for field programmable gate arrays (FPGAs), application specific integrated circuits (ASICs), and other similar electronic devices. In one embodiment, execution of instructions from a VMPP causes a VHDL program to configure the VHDL chip 137, which may be an FPGA, ASIC, or the like.

In another embodiment of the present invention, execution of instructions from VMPP results in a utilization of VHDL program to program a VHDL emulation chip 151. VHDL emulation chip 151 may incorporate a similar architecture as described above for VHDL chip 137. Once VMPP and VHDL program the VHDL emulation chip 151, VHDL emulation chip 151 performs, as hardware, some or all functions described by one or more executions of some or all of the instructions found in VMPP. That is, the VHDL emulation chip 151 is a hardware emulation of some or all of the software instructions found in VMPP. In one embodiment, VHDL emulation chip 151 is a programmable read only memory (PROM) that, once burned in accordance with instructions from VMPP and VHDL program, is permanently transformed into a new circuitry that performs the functions needed to perform the processes of the present invention.

The hardware elements depicted in computer 100 are not intended to be exhaustive, but rather are representative devices suitable to perform the processes of the present invention. For instance, computer 100 may include alternate memory storage devices such as magnetic cassettes, digital versatile disks (DVDs), Bernoulli cartridges, and the like. These and other variations are intended to be within the spirit and scope of the present invention.

Figure 7:
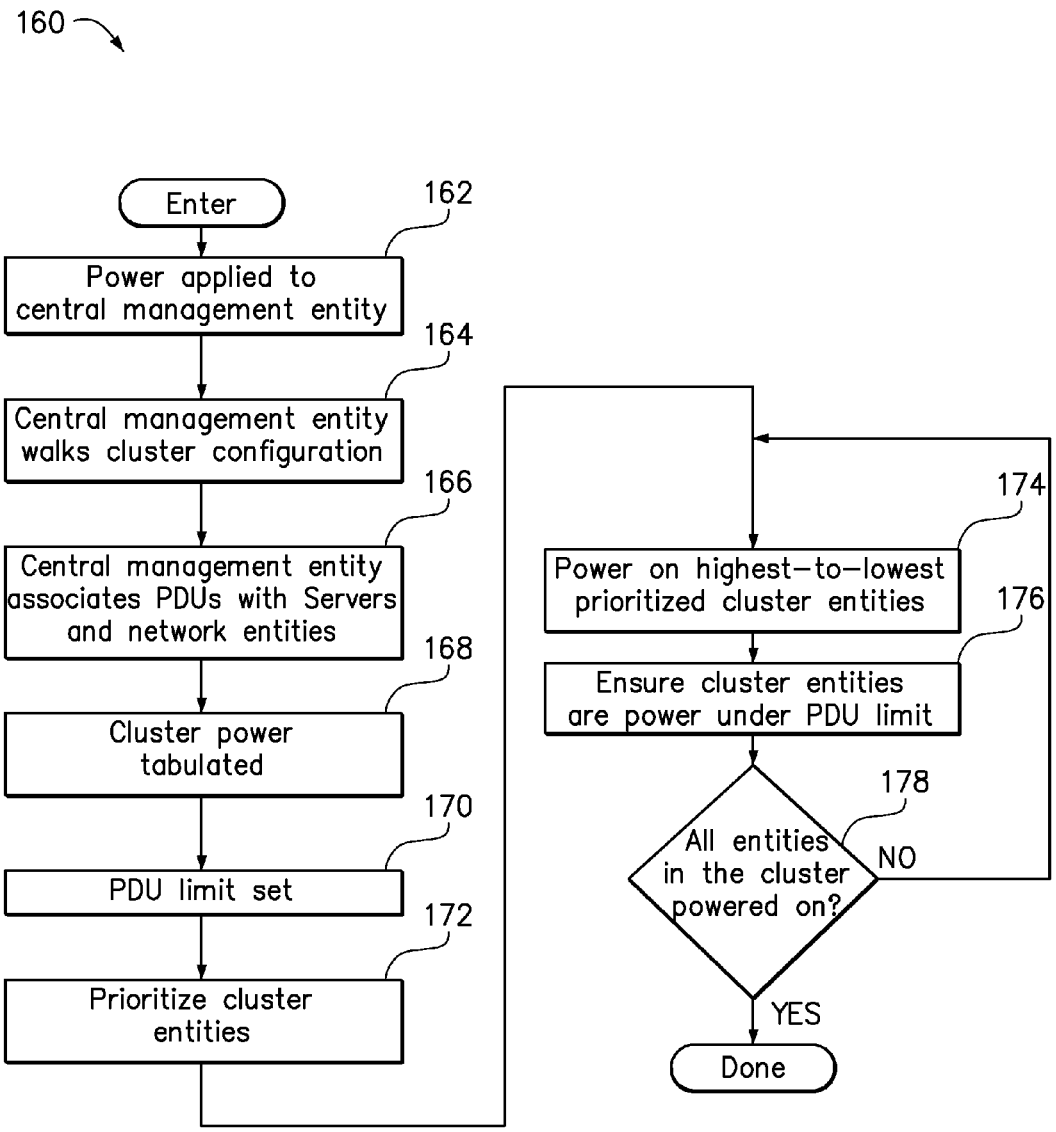
FIG. 7 is a flowchart of a method of the present invention in which a management entity controls a power up sequence.

FIG. 7 is a flowchart of a method 160 of the present invention in which a management entity controls a power up sequence. In step 162, power is applied to the central management entity. Then, in step 164, the central management entity walks the cluster configuration by communicating with the BMC or service processor of each device in the cluster, including the servers, PDUs and network switches. The central management entity collects various data, including the model identification codes for each of the devices in the cluster, in order to determine the relative commonality of the devices. The central management entity may then associate the servers and other network entities with a given one of the PDUs in step 166. The cluster power is tabulated in step 168, the current limits for each PDU are set in step 170, and cluster entities are prioritized according to ascending commonality in step 172.

In step 174, power is turned on to the devices in a sequence of ascending commonality. Step 176 ensures that the cluster entities or devices are drawing power that is under the PDU limit. Then in step 178, the method determines whether all of the cluster entities or devices are powered on. If not, then the method returns to step 174. However, when all of the devices are powered on, the method ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product including computer usable program code embodied on a non-transitory computer usable storage medium, the computer program product comprising:

computer usable program code for identifying a plurality of power distribution units disposed in a rack, wherein each power distribution units is connected to receive power from a main power source, and wherein each power distribution unit includes a circuit breaker;

computer usable program code for identifying a plurality of devices disposed in the rack, wherein each device is connected to receive power from one of the power distribution units, and wherein the plurality of devices are selected from server nodes, network switches and external data storage devices;

computer usable program code for obtaining vital product data from a service processor in each device, wherein the vital product data identifies the device by a model identification code; and computer usable program code for powering on, for each of the power distribution units, the plurality of devices that are connected to the power distribution unit in a sequence to prevent an inrush current from tripping the circuit breaker within the power distribution unit, wherein the sequence powers on devices in order of ascending commonality of the model identification code.

2. The computer program product of claim 1, further comprising:

computer usable program code for determining the order of ascending commonality by tabulating the number of devices having a given model identification code and sorting a list of model identification codes from those having the fewest tabulated number of devices to those having the greatest tabulated number of devices.

3. The computer program product of claim 1, wherein the sequence includes powering on more than one of the devices at a time.

4. The computer program product of claim 1, further comprising:
   computer usable program code for waiting a predetermined period of time between powering on any one or more device and subsequently powering on any further device.

5. The computer program product of claim 1, further comprising:
   computer usable program code for identifying the rack position of each device with the rack, wherein the rack position determines the power distribution unit to which the device is connected.

6. The computer program product of claim 5, wherein the rack position of each device is identified by each device detecting a rack position and communicating the detected rack position to a central management entity.

7. The computer program product of claim 1, wherein the sequence of powering on the plurality of devices also prevents an inrush current from tripping a circuit breaker within the main power source that is connected to provide power to each of the power distribution units.

8. A computer program product including computer usable program code embodied on a non-transitory computer usable storage medium, the computer program product comprising:
   computer usable program code for identifying a plurality of power distribution units disposed in a rack, wherein each power distribution units is connected to receive power from a main power source, and wherein each power distribution unit includes a circuit breaker;
   computer usable program code for identifying a plurality of devices disposed in the rack, wherein each device is connected to receive power from one of the power distribution units, and wherein the plurality of devices are selected from server nodes, network switches and external data storage devices;
   computer usable program code for obtaining vital product data from a service processor in each device, wherein the vital product data identifies the device by a model identification code;
   computer usable program code for powering on, for each of the power distribution units, the plurality of devices that are connected to the power distribution unit in a sequence to prevent an inrush current from tripping the circuit breaker within the power distribution unit, wherein the sequence powers on devices in order of ascending commonality of the model identification code;
   computer usable program code for determining a peak inrush current for each of the plurality of devices;
   computer usable program code for determining a current rating for the circuit breaker in each of the plurality of power distribution units; and
   computer usable program code for determining that, for each of the plurality of distribution units, the sequence for powering on the plurality of devices will not cause a cumulative peak inrush current through the power distribution unit to exceed the current rating for the circuit breaker in the power distribution unit, wherein the cumulative peak inrush current is the sum of the peak inrush current through the power distribution unit to all of the devices being simultaneously powered on at any point in the sequence.

9. The computer program product of claim 8, wherein the peak inrush current for each device is a predetermined multiple of the nominal current rating of the device.

10. The computer program product of claim 9, wherein the vital product data further includes a nominal current rating of the device.

11. The computer program product of claim 8, further comprising:
    computer usable program code for determining the order of ascending commonality by tabulating the number of devices having a given model identification code and sorting a list of model identification codes from those having the fewest tabulated number of devices to those having the greatest tabulated number of devices.

12. The computer program product of claim 8, wherein the sequence includes powering on more than one of the devices at a time.

13. The computer program product of claim 8, further comprising:
    computer usable program code for waiting a predetermined period of time between powering on any one or more device and subsequently powering on any further device.

14. The computer program product of claim 8, further comprising:
    computer usable program code for identifying the rack position of each device with the rack, wherein the rack position determines the power distribution unit to which the device is connected.

15. The computer program product of claim 14, wherein the rack position of each device is identified by each device detecting a rack position and communicating the detected rack position to a central management entity.

16. The computer program product of claim 8, wherein the sequence of powering on the plurality of devices also prevents an inrush current from tripping a circuit breaker within the main power source that is connected to provide power to each of the power distribution units.

* * * * *